(12) United States Patent
Hwang

(10) Patent No.: US 12,732,042 B2
(45) Date of Patent: Sep. 8, 2026

(54) MOTOR

(71) Applicant: SAMSUNG ELECTRONICS CO., LTD., Suwon-si (KR)

(72) Inventor: Woong Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 188 days.

(21) Appl. No.: 18/813,718

(22) Filed: Aug. 23, 2024

(65) Prior Publication Data

US 2025/0149942 A1 May 8, 2025

Related U.S. Application Data

(63) Continuation of application No. PCT/KR2024/011219, filed on Jul. 31, 2024.

(30) Foreign Application Priority Data

Nov. 3, 2023 (KR) ........................ 10-2023-0150951

(51) Int. Cl.
*H02K 1/276* (2022.01)
*H02K 1/27* (2022.01)
(Continued)

(52) U.S. Cl.
CPC ............ *H02K 1/28* (2013.01); *H02K 1/2773* (2013.01); *H02K 15/03* (2013.01); *H02K 15/12* (2013.01)

(58) Field of Classification Search
CPC .. H02K 1/22; H02K 1/24; H02K 1/28; H02K 1/27; H02K 1/2706; H02K 1/276;
(Continued)

(56) References Cited

U.S. PATENT DOCUMENTS 5,786,650 A * 7/1998 Uchida .................. H02K 15/03
310/156.55
10,734,855 B2 8/2020 Yoon et al.
(Continued)

FOREIGN PATENT DOCUMENTS

CN 106712348 A * 5/2017 ............ H02K 1/276
CN 108667172 A 10/2018
(Continued)

OTHER PUBLICATIONS

International Search Report mailed on Nov. 5, 2024 in International Patent Application No. PCT/KR2024/011219.
(Continued)

*Primary Examiner* — Edgardo San Martin
(74) *Attorney, Agent, or Firm* — STAAS & HALSEY LLP

(57) ABSTRACT

A motor may include a shaft, a stator and a rotor. The rotor may include a plurality of magnets, a casing and a rotor core. The rotor core may include a plurality of first core layers and a plurality of second core layers. The first core layer may include a base part through which the shaft passes, a plurality of core parts spaced apart from each other along a circumferential direction of the base part, and a plurality of bridge parts configured so that each of the plurality of bridge parts extends from a corresponding core part of the plurality of core parts toward the base part, and is bent toward the corresponding core part.

20 Claims, 21 Drawing Sheets

(51) Int. Cl.

| | |
|---|---|
| ***H02K 1/28*** | (2006.01) |
| ***H02K 15/027*** | (2025.01) |
| ***H02K 15/03*** | (2006.01) |
| ***H02K 15/035*** | (2025.01) |
| ***H02K 15/12*** | (2006.01) |
| ***H02K 15/121*** | (2025.01) |

(58) Field of Classification Search

CPC .... H02K 1/2766; H02K 1/2773; H02K 15/02; H02K 15/022; H02K 15/027; H02K 15/0273; H02K 15/03; H02K 15/035; H02K 15/10; H02K 15/12; H02K 15/121

See application file for complete search history.

(56) References Cited

U.S. PATENT DOCUMENTS

| | | | | |
|---|---|---|---|---|
| 10,811,918 | B2 | 10/2020 | Jang et al. | |
| 10,833,569 | B2 * | 11/2020 | Migita | H02K 15/26 |
| 11,356,003 | B2 * | 6/2022 | Ikeda | H01F 41/02 |
| 2017/0133895 | A1 | 5/2017 | Lee et al. | |
| 2018/0048200 | A1 | 2/2018 | Jang et al. | |
| 2024/0171022 | A1 * | 5/2024 | Hwang | H02K 1/276 |
| 2024/0186851 | A1 * | 6/2024 | Yang | H02K 1/2766 |

FOREIGN PATENT DOCUMENTS

| | | | | | |
|---|---|---|---|---|---|
| CN | 110311491 | A | * | 10/2019 | H02K 1/276 |
| CN | 110350694 | A | * | 10/2019 | H02K 1/2706 |
| CN | 211790987 | U | * | 10/2020 | |
| CN | 111969748 | A | * | 11/2020 | H02K 1/27 |
| CN | 214543844 | U | * | 10/2021 | |
| CN | 113659747 | A | | 11/2021 | |
| CN | 113691041 | A | * | 11/2021 | H02K 21/021 |
| CN | 114243974 | A | * | 3/2022 | H02K 1/28 |
| CN | 216056537 | U | * | 3/2022 | |
| CN | 217445101 | U | | 9/2022 | |
| CN | 117097050 | A | * | 11/2023 | H02K 1/276 |
| DE | 102011122023 | A1 | * | 6/2013 | H02K 1/2773 |
| DE | 102013226379 | A1 | * | 6/2015 | H02K 1/2773 |
| KR | 20-0462692 | | | 9/2012 | |
| KR | 10-1270836 | | | 6/2013 | |
| KR | 10-2015-0009453 | | | 1/2015 | |
| KR | 10-2016-0132512 | | | 11/2016 | |
| KR | 10-1970532 | | | 4/2019 | |
| KR | 10-2021-0088271 | | | 7/2021 | |
| KR | 10-2023-0026722 | | | 2/2023 | |
| WO | WO 2018/108492 | A1 | | 6/2018 | |

OTHER PUBLICATIONS

Written Opinion mailed on Nov. 5, 2024 in International Patent Application No. PCT/KR2024/011219.

* cited by examiner

MOTOR

CROSS-REFERENCE TO RELATED APPLICATIONS

This application is a continuation application of International Application No. PCT/KR2024/011219 designating the United States, filed on Jul. 31, 2024, in the Korean Intellectual Property Receiving Office, which claims priority from Korean Patent Application No. 10-2023-0150951, filed on Nov. 3, 2023, in the Korean Intellectual Property Office, the disclosures of which are hereby incorporated by reference herein in their entireties.

BACKGROUND

Field

Various embodiments of the disclosure relate to a rotor including a fully split type rotor core.

Description of Related Art

A motor is a mechanical device that obtains a rotational force from electrical energy. The motor includes a stator and a rotor. The motor rotates as the rotor and the stator interact electromagnetically.

Among various types of motors, permanent magnet motors using a permanent magnet to form a magnetic field may be divided into a surface permanent magnet (SPM) permanent magnet motor and an interior permanent magnet (IPM) permanent magnet motor.

As a type of the IPM permanent magnet motor, the spoke type permanent magnet motor has a structurally high magnetic flux concentration and is thus able to generate high torque and high output with a reduced size as compared with other types of motors with the same power. Accordingly, it may be applied to driving motors such as for washing machines or electric vehicles requiring high torque and high output.

The rotor of a spoke type permanent magnet motor includes a shaft, a rotor core through which the shaft passes, and a plurality of magnets (e.g., permanent magnets) inserted into the rotor core.

Generally, the rotor core is manufactured by forming a thin steel sheet supplied to a strip into individual sheets by pressing and then stacking them. The rotor core includes a base part through which the shaft passes, core parts disposed along the circumferential direction of the base part, and a bridge part connecting the base part and the core parts.

In the case of such a spoke type permanent magnet motor, when the motor is operated, a portion of the magnetic flux may leak toward the shaft through the bridge portion of the rotor core, reducing the efficiency of the motor.

SUMMARY

Various embodiments of the disclosure may provide a rotor core including a plurality of core parts divided by a punching operation of a molding device during insert injection molding.

According to an embodiment of the disclosure, a motor may include a shaft, a stator and a rotor. The rotor may include a plurality of magnets, a casing and a rotor core. The rotor core may include a first core layer and a second core layer. The first core layer may include a base part through which the shaft passes, a plurality of core parts spaced apart from each other along a circumferential direction of the base part, and a plurality of bridge parts configured so that each of the plurality of bridge parts extends from a corresponding core part of the plurality of core parts toward the base part, and is bent toward the corresponding core part.

According to an embodiment of the disclosure, a motor may include a shaft, a stator and a rotor. The rotor may include a plurality of magnets, a casing and a rotor core. The rotor core may include a through hole into which the shaft is inserted, a first core layer, and a second core layer. The first core layer may include a plurality of core parts spaced apart from each other along a circumferential direction of the through hole, and a plurality of bridge parts including a pair of stop protrusions respectively protruding in a circumferential direction from each side of, and bent toward, an outer end of each core part of the plurality of core parts.

According to an embodiment of the disclosure, a method may be provided, of manufacturing a motor including a shaft, a stator and a rotor including a plurality of magnets, a casing and a rotor core, the method including forming the rotor core by stacking a first core layer, including a plurality of bridge parts, and a second core layer not including the plurality of bridge parts. The method of manufacturing the motor may include seating the rotor core on the lower mold; mounting the plurality of magnets on the rotor core. The method of manufacturing the motor may include lowering the upper mold having the punching part to punch the plurality of bridge parts of the first core layer.

According to various embodiments of the disclosure, the base part and the bridge of the rotor core may be disconnected through the punching operation of the molding device during insert injection molding to divide the core parts connected to the base part. In this case, magnetic flux leakage to the shaft side through the bridge part may be prevented when the motor is operated, and thus the efficiency of the motor may be increased.

Further, as the bridge part bent toward the rotor core according to the punching operation of the molding device during insert injection molding is surrounded by the resin constituting the injection molding member, the divided core parts may be prevented from escaping off during the operation of the motor.

Effects that are obtainable from example embodiments of the disclosure may be clearly derived and understood from the following description by those having ordinary knowledge in the technical field to which the embodiments of the disclosure belong. In other words, unintended effects in practicing the example embodiments of the disclosure may be also derived by those having ordinary knowledge in the technical field from the embodiments of the disclosure.

BRIEF DESCRIPTION OF THE DRAWINGS

In conjunction with the description of the drawings, the same or similar reference numerals may be used for the same or similar components.

DETAILED DESCRIPTION

Figure 1:
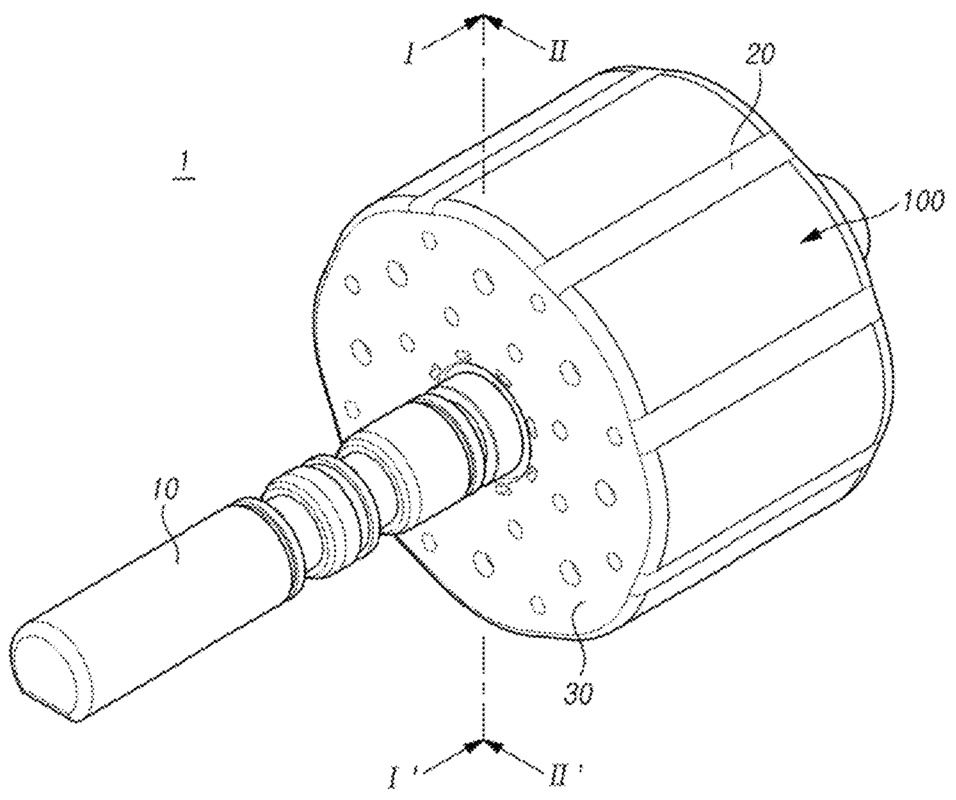
FIG. 1 is a perspective view illustrating a rotor according to an embodiment.

It should be appreciated that various embodiments of the disclosure and the terms used therein are not intended to limit the technological features set forth herein to particular embodiments, and they may include various changes, equivalents, or replacements for a corresponding embodiment.

In connection with the description of drawings, like reference numerals may be used to refer to similar or related elements.

The singular form of a noun corresponding to an item may include one or more items, unless the relevant context explicitly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases.

As used herein, such terms as "1st" and "2nd," or "first" and "second" may be used to in simply distinguish a corresponding component from another, and does not limit the components in other aspect (e.g., importance or order).

It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

The terms "comprise", "include" or "have" are intended to indicate that there are features, numbers, steps, operations, elements, parts, or a combination thereof described in the disclosure, and do not preclude the possibility of presence or addition of one or more other features, numbers, steps, operations, elements, parts, or a combination thereof.

When an element is referred to as being "connected", "coupled", "supported", or "in contact" with (to) another element, it includes not only when the element is directly connected, coupled, supported, or in contact with the other element, but also when the element is indirectly connected, coupled, supported, or in contact with the other element via a third element.

When an element is referred to as being located "on" another element, it may include not only when the element is in contact with the other element, but also when another element exists between the two elements.

The term "and/or" includes any combination of a plurality of related elements or any one of a plurality of related elements.

Hereinafter, the operating principle and embodiments of the disclosure will be described with reference to the accompanying drawings.

A motor is a mechanical device that converts electrical energy into mechanical energy (e.g., kinetic energy). The motor may include a rotor (e.g., the rotor 1 of FIG. 1) and a stator (not shown) that interact electromagnetically. The motor may rotate the rotor 1 through electromagnetic interaction between the rotor 1 and the stator. Specifically, when a current is applied to the stator, the rotor 1 may be rotated by electromagnetic interaction with the stator, and power such as rotational force may be provided to a power device including a motor through a shaft coupled to the rotor 1.

FIG. 1 is a perspective view illustrating a rotor according to an embodiment.

Figure 2:
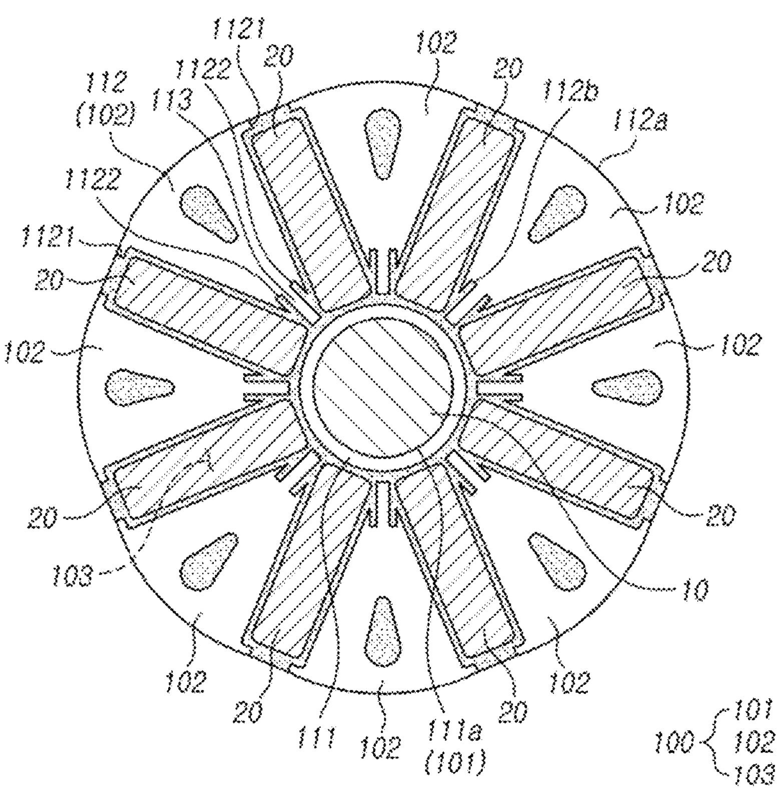
FIG. 2 is a cross-sectional view taken along line I-I' of FIG. 1.

FIG. 2 is a cross-sectional view taken along line I-I' of FIG. 1.

Figure 3:
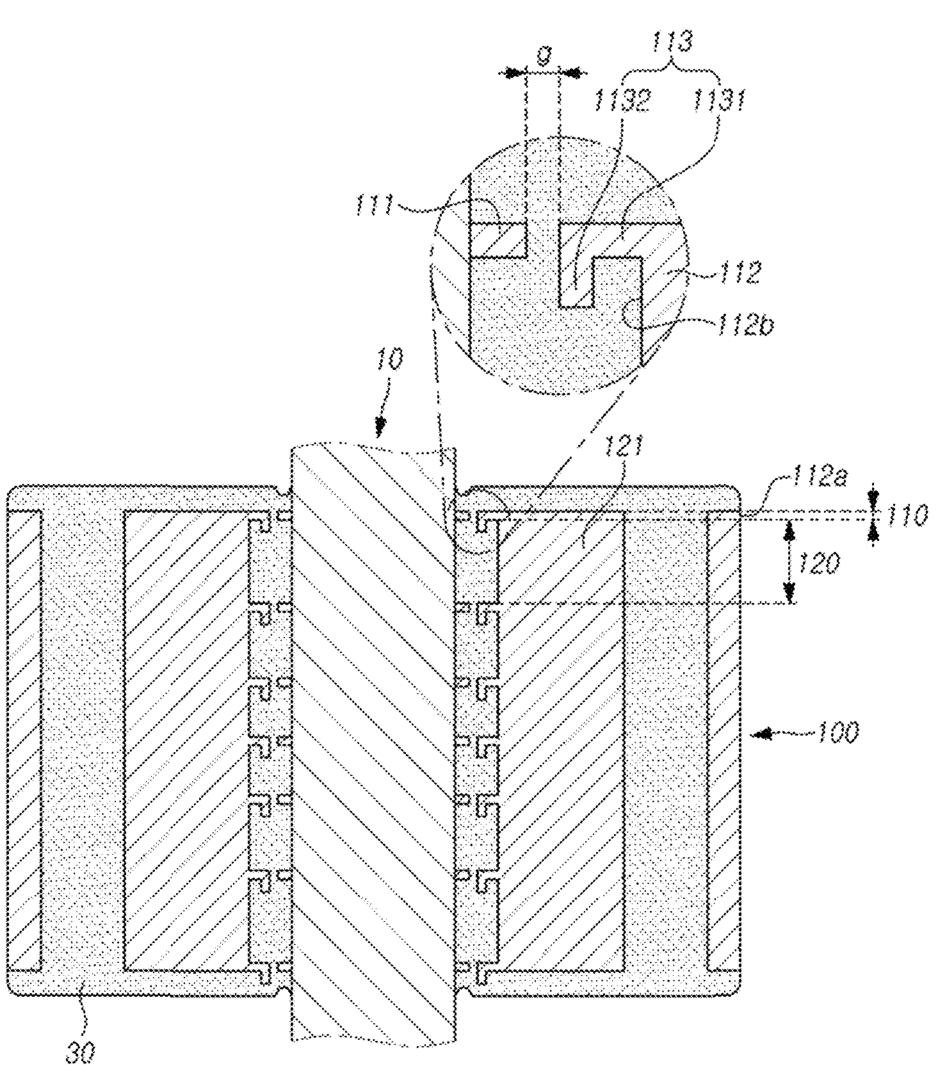
FIG. 3 is a cross-sectional view taken along line II-II' of FIG. 1.

FIG. 3 is a cross-sectional view taken along line II-II' of FIG. 1.

Figure 4:
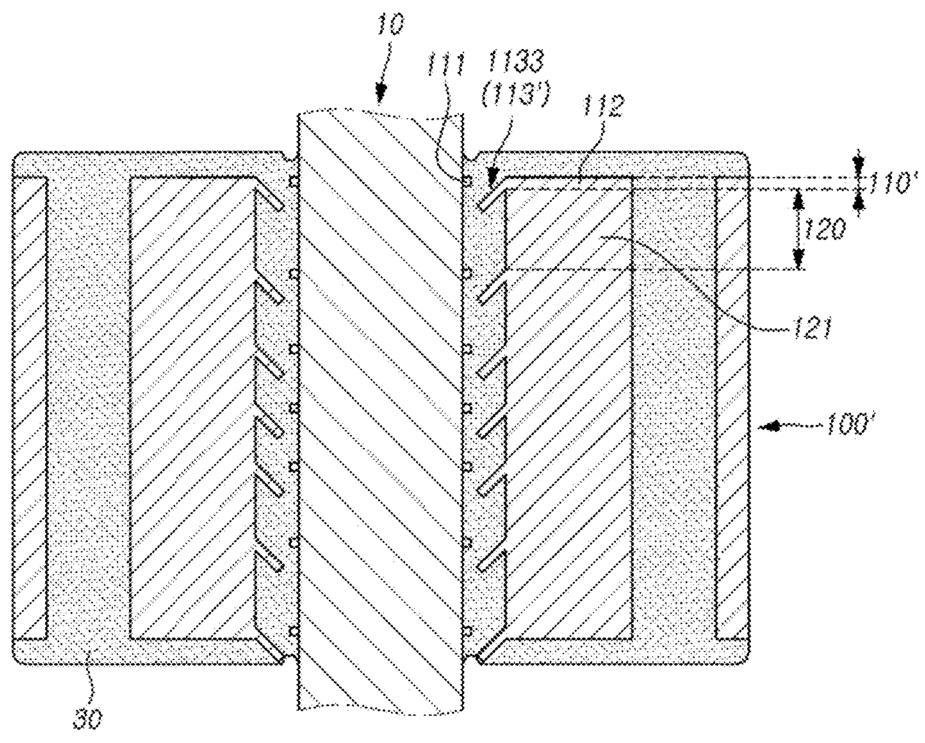
FIG. 4 is a cross-sectional view illustrating a rotor according to an embodiment.

FIG. 4 is a cross-sectional view illustrating a rotor according to an embodiment.

Referring to FIGS. 1 to 3, a rotor 1 according to an embodiment may include a shaft 10, a plurality of magnets 20, and a rotor core 100.

According to an embodiment, the shaft 10 may be coupled to the rotor core 100. In an embodiment, the shaft 10 may be coupled to the inside of the rotor core 100 through a through hole 101 of the rotor core 100. The shaft 10 may be coupled to the rotor core 100 by, e.g., insert injection molding.

According to an embodiment, the plurality of magnets 20 may be inserted into and mounted on the rotor core 100. In an embodiment, the plurality of magnets 20 may be positioned radially outside the through hole 101 of the rotor core 100. In an embodiment, the plurality of magnets 20 may be disposed to be spaced apart from each other by a predetermined gap along the circumferential direction of the through hole 101. Each of the plurality of magnets 20 may be inserted into a slot 103 formed between the split rotor cores 102 of the rotor core 100 and fixed inside the rotor core 100.

According to an embodiment, the rotor core 100 may include a through hole 101, a plurality of split rotor cores 102, and a plurality of slots 103.

In an embodiment, the through hole 101 may be formed in a central portion of the rotor core 100. In an embodiment, the through hole 101 may extend in the vertical direction. The shaft 10 may be inserted into the through hole 101 and coupled to the rotor core 100.

In an embodiment, the plurality of split rotor cores 102 may be positioned radially outside the through hole 101 of the rotor core 100. The plurality of split rotor cores 102 may be disposed to be spaced apart from each other by a predetermined gap along the circumferential direction of the through hole 101. The slot 103, which is a space into which a plurality of magnets 20 are inserted, may be formed between the plurality of split rotor cores 102. In an embodiment, the plurality of split rotor cores 102 may be formed by splitting the core parts 112 and 121 of the stacked core layers 110 and 120 by the punching operation of the molding device 200 during insert injection molding.

According to an embodiment, the rotor core 100 may be manufactured by stacking a plurality of thin steel sheets. In an embodiment, the rotor core 100 may include a plurality of first core layers 110 and a plurality of second core layers 120 where a plurality of thin steel sheets are stacked. In an embodiment, the steel sheets constituting the plurality of first core layers 110 and the steel sheets constituting the plurality of second core layers 120 may have different shapes. In an embodiment, the rotor core 100 may be formed by alternately stacking a plurality of first core layers 110 and a plurality of second core layers 120. The first core layer 110 may be disposed at, e.g., an uppermost end and a lowermost end of the rotor core 100, but the disclosure is not limited thereto.

According to an embodiment, the first core layer 110 may include a base part 111, a plurality of first core parts 112, and a plurality of bridge parts 113.

According to an embodiment, the base part 111 may have a ring shape. In an embodiment, the base part 111 may include a hole 111*a* through which the shaft 10 passes.

According to an embodiment, the plurality of first core parts 112 may be spaced apart from the base part 111 by a predetermined gap. In an embodiment, the plurality of first core parts 112 may be disposed to be spaced apart from each other by a predetermined gap along the circumferential direction of the base part 111 with respect to the base part 111.

According to an embodiment, each of the plurality of first core parts 112 may include a pair of stop protrusions 1121 protruding from the outer end 112*a* to two opposite sides in the circumferential direction. In an embodiment, the pair of stop protrusions 1121 may contact the outer surface of the magnet 20 mounted on the rotor core 100 and/or resin filled in the slot 103 and surrounding the magnet 20 to prevent the magnet 20 from escaping from the rotor core 100.

According to an embodiment, each of the plurality of first core parts 112 may include a pair of bending grooves 1122 provided in the inner end 112*b* and formed on two opposite sides of the bridge part 113. In an embodiment, the pair of bending grooves 1122 may be formed by being cut or recessed, in two opposite sides of the bridge part 113, by a predetermined section from the inner end 112*b* of the first core part 112 to the outer end 112*a*. During insert injection molding, a resin may fill the inside of the rotor core 100 through the pair of bending grooves 1122 to surround the bridge part 113.

According to an embodiment, the plurality of bridge parts 113 may be provided at the respective inner ends 112*b* of the plurality of first core parts 112. In an embodiment, at least a portion of the bridge part 113 may be bent to face the inner surface of the first core part 112. In an embodiment, the bridge part 113 may be spaced apart from the base part 111 by a predetermined gap g.

According to an embodiment, the bridge part 113 may include a connection portion 1131 extending inward from the inner end 112*b* of the first core part 112 and a stop portion 1132 bent at a predetermined angle from the connection portion 1131.

In an embodiment, the stop portion 1132 may be bent to be perpendicular to the connecting portion 1131. For example, the stop portion 1132 may vertically extend downward from the extension portion 1131.

Referring to FIG. 4, the bridge part 113' of the first core layer 110' according to an embodiment may include a stop portion 1133 extending inward from the inner end 112*b* of the first core part 112 and bent at a predetermined angle from the first core part 112. The bridge part 113' illustrated in FIG. 4 may be configured as one stop portion 1133, unlike the bridge part 113 illustrated in FIG. 3.

In an embodiment, the stop portion 1133 may be bent to be inclined with respect to the first core part 112. For example, the stop portion 1133 may extend downwardly from the first core part 112.

In an embodiment, the stop portions 1132 and 1133 may be formed as the bridge part (113*a* of FIG. 12B) and the base part 111 are disconnected by the lowering operation of the punching part 222 (e.g., the punching part 222 of FIG. 12B) provided in the upper mold (e.g., the upper mold 220 of FIG. 12B) during insert injection molding, and the bridge part 113*a* is bent to face the inner surface of the first core part 112. Hereinafter, a method for forming the stop portions 1132 and 1133 is described with reference to FIGS. 11 to 12C.

According to an embodiment, the second core layer 120 may include a plurality of second core parts 121. In an embodiment, the plurality of second core parts 121 may be disposed to be spaced apart from each other by a predetermined gap along the circumferential direction of the through hole 101 with respect to the through hole 101 of the rotor core 100. In an embodiment, the plurality of second core parts 121 may have substantially the same arrangement or stacked structure as the plurality of first core parts 112. For example, the plurality of first core parts 112 and the plurality of second core parts 121 may be alternately stacked to form the split rotor core 102. In an embodiment, unlike the first core layer 110, the second core layer 120 may not include the base part 111 and the bridge part 113.

According to an embodiment, the rotor 1 may include an injection molding member 30 surrounding at least a portion of the rotor core 100. The injection molding member 30 may also be referred to as a casing.

In an embodiment, the injection molding member 30 may be formed by injecting and curing resin into an empty space between internal gaps of the rotor core 100 while the plurality of magnets 20 are mounted on the rotor core 100.

In an embodiment, a portion of the resin injected into the rotor core 100 may be injected into the inside of the rotor core 100 through a gap g between the base part 111 and the bridge part 113, and a portion of the resin may entirely surround the stop portion 1132 of the bridge part 113. In this case, as the plurality of split rotor cores 102 are coupled to the injection molding member 30 by the stop portion 1132 of the bridge part 113, the plurality of split rotor cores 102 may be prevented from scattering to the outside by the rotational force of the motor when the motor is operated.

Figure 5:
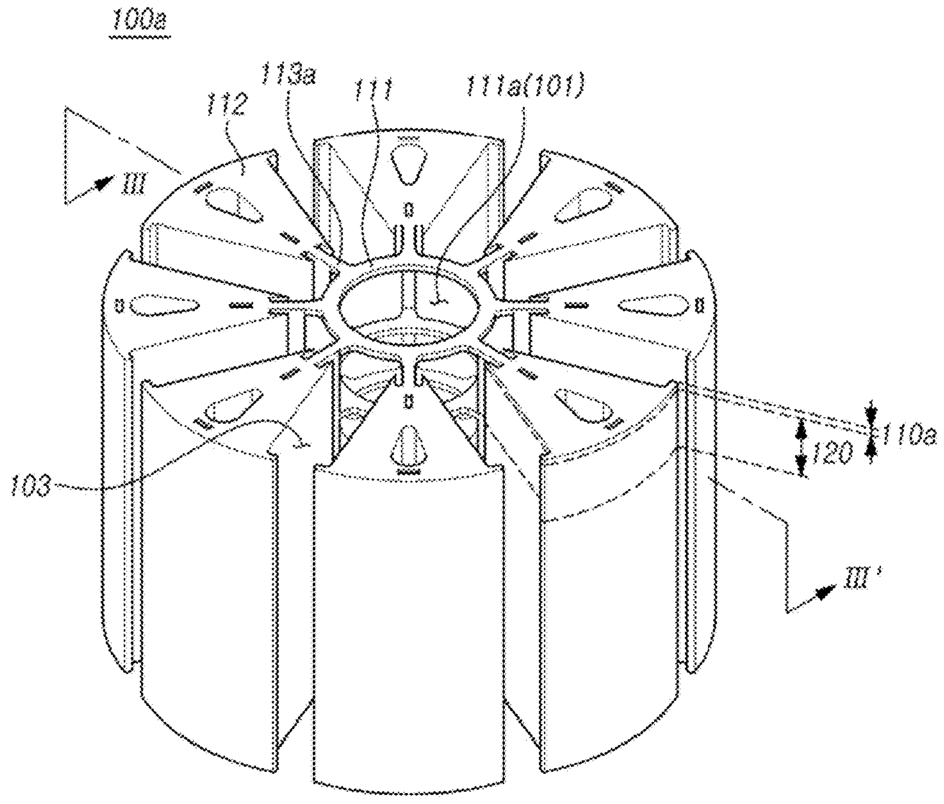
FIG. 5 is a perspective view illustrating a rotor core in a state before punching according to an embodiment.

FIG. 5 is a perspective view illustrating a rotor core in a state before punching according to an embodiment.

Figure 6:
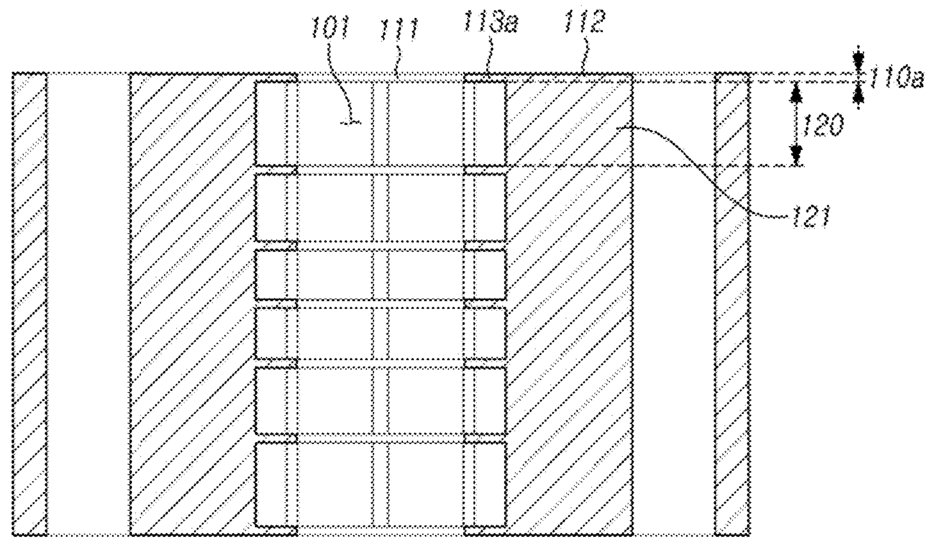
FIG. 6 is a cross-sectional view taken along line III-III' of FIG. 5.

FIG. 6 is a cross-sectional view taken along line III-III' of FIG. 5.

Figure 7:
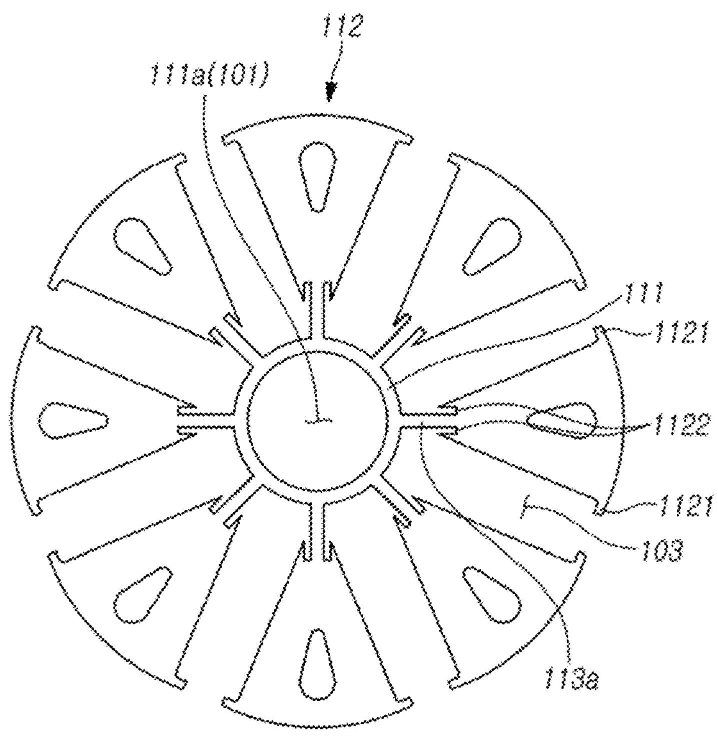
FIG. 7 is a plan view illustrating a rotor core in a state before punching according to an embodiment.

FIG. 7 is a plan view illustrating a rotor core in a state before punching according to an embodiment.

Figure 8:
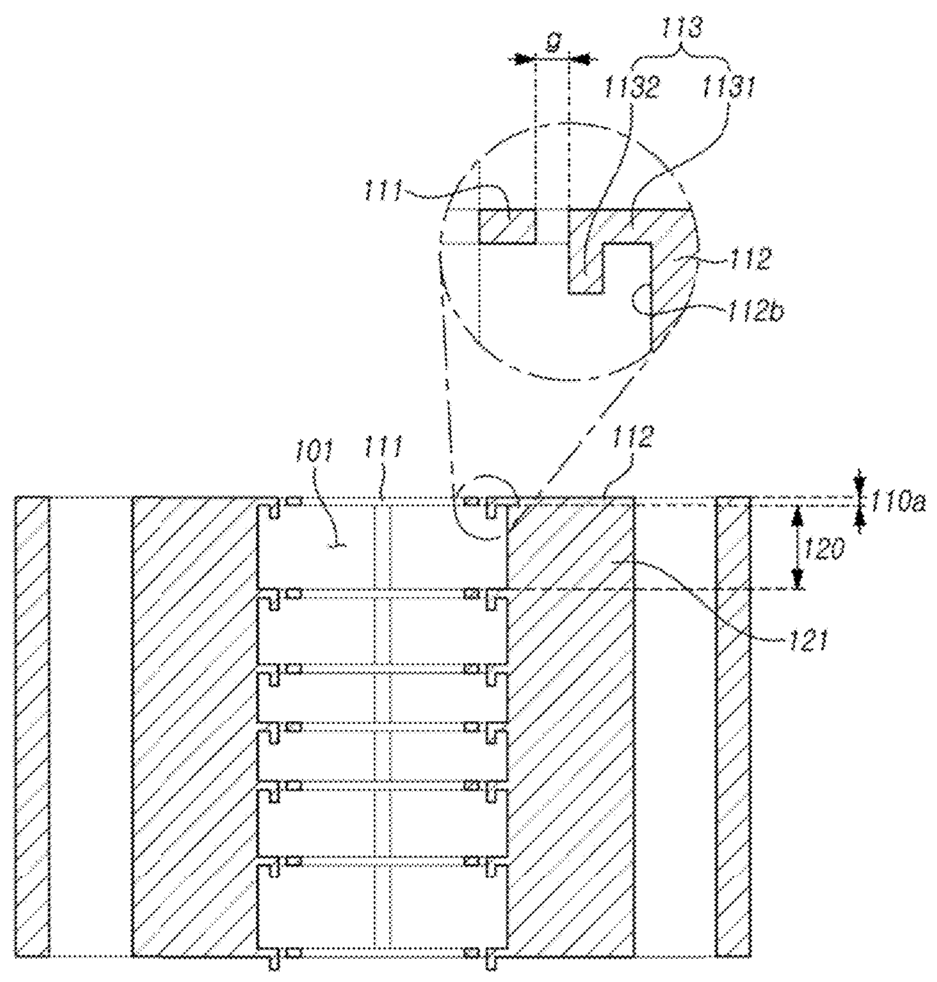
FIG. 8 is a cross-sectional view illustrating a rotor core in a state after punching according to an embodiment.

FIG. 8 is a cross-sectional view illustrating a rotor core in a state after punching according to an embodiment.

Figure 9:
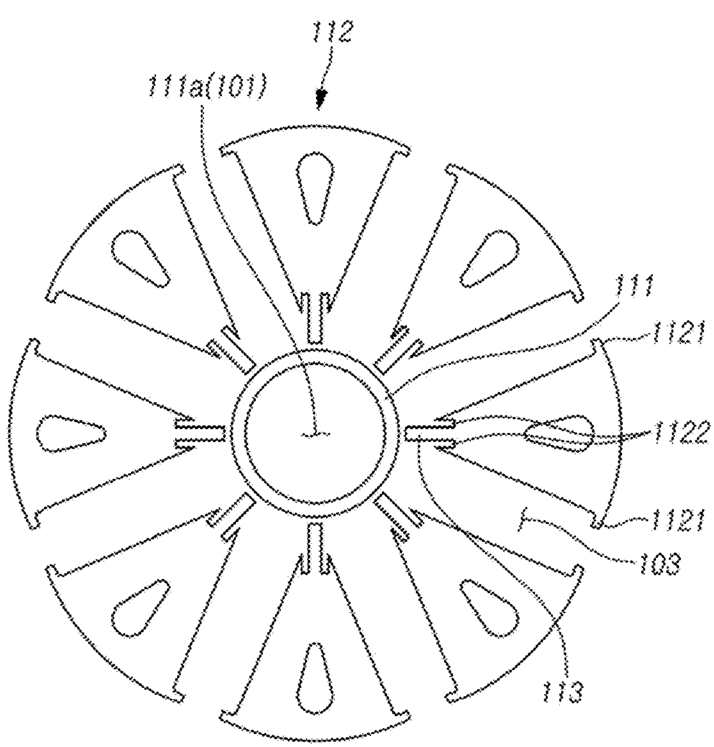
FIG. 9 is a plan view illustrating a rotor core in a state after punching according to an embodiment.

FIG. 9 is a plan view illustrating a rotor core in a state after punching according to an embodiment.

Figure 10:
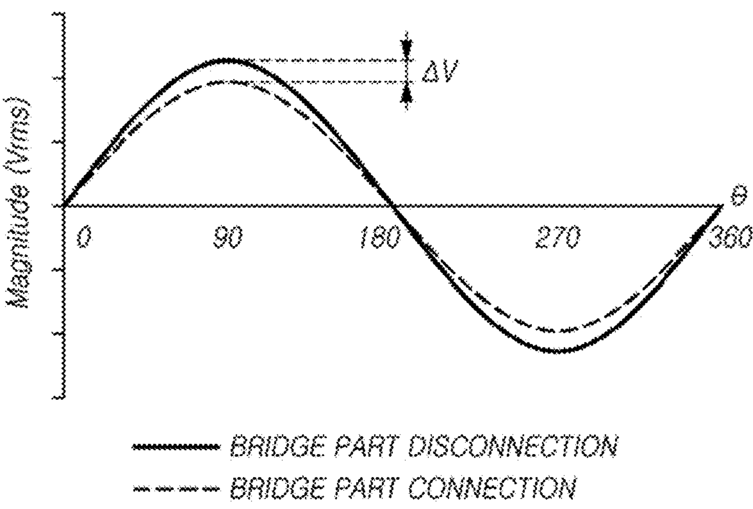
FIG. 10 is a graph for comparing efficiency of a motor before and after punching of a bridge unit.

FIG. 10 is a graph for comparing efficiency of a motor before and after punching of a bridge unit.

FIGS. 5 to 7 are views illustrating a rotor core 100*a* including a first core layer 110*a* in which a plurality of first core parts 112 are connected to a base part 111 through a bridge part 113*a*. In other words, FIGS. 5 to 7 illustrate a rotor core 100*a* including a bridge part 113*a* before being punched by a molding device (e.g., the molding device 200 of FIGS. 12A, 12B and 12C).

FIGS. 8 and 9 are views illustrating a rotor core 100 including a first core layer 110 in which a base part 111 and a plurality of first core parts 112 are spaced apart from each other. In other words, FIGS. 8 and 9 illustrate a rotor core 100 including a bridge part 113 after being punched by a molding device 200.

Referring to FIGS. 5 to 7, the first core layer 110*a* of the rotor core 100*a* according to an embodiment may include a plurality of bridge parts 113*a* connecting the base part 111 and the plurality of first core parts 112. When the plurality of first core parts 112 are connected to the base part 111 by the plurality of bridge parts 113*a*, the base part 111, the plurality of first core parts 112, and the plurality of bridge parts 113*a* may form a magnetic path when the motor is operated. As the magnetic flux leaks toward the shaft 10 through the bridge part 113*a*, the efficiency of the motor may be reduced.

In order to reduce the leakage magnetic flux through the bridge part 113*a*, it is necessary to disconnect the plurality of first core parts 112 and the base part 111 as illustrated in FIGS. 1 to 4.

Referring to FIGS. 8 and 9, the first core layer 110 of the rotor core 100 according to an embodiment may include a bridge part 113 spaced apart from the base part 111 by a predetermined gap. The bridge part 113 and the base part 111 of the first core layer 110 may be disconnected from each other to form a gap g therebetween. Each of the plurality of first core parts 112 may be divided from the base part 111, and accordingly, the base part 111, the plurality of first core parts 112, and the bridge part 113 may form no magnetic path, and thus magnetic flux leakage to the shaft 10 through the bridge part 113 may be reduced.

Referring to FIG. 10, it may be identified that the counter electromotive force when the plurality of first core parts 112 and the base part 111 are disconnected is increased by about ΔV (e.g., about 10%) as shown in FIGS. 8 and 9, compared to when plurality of first core parts 112 and the base part 111 are connected through the bridge part 113*a* as shown in FIGS. 5 to 7, and in this case, the efficiency of the motor may also increase substantially (e.g., about 3%).

Hereinafter, a method for manufacturing the rotor core 100 including the plurality of first core parts 112 divided by disconnecting (or punching) the bridge part 113 of the first core layer 110 from the base part 111 is described with reference to FIGS. 11 to 12C.

Figure 11:
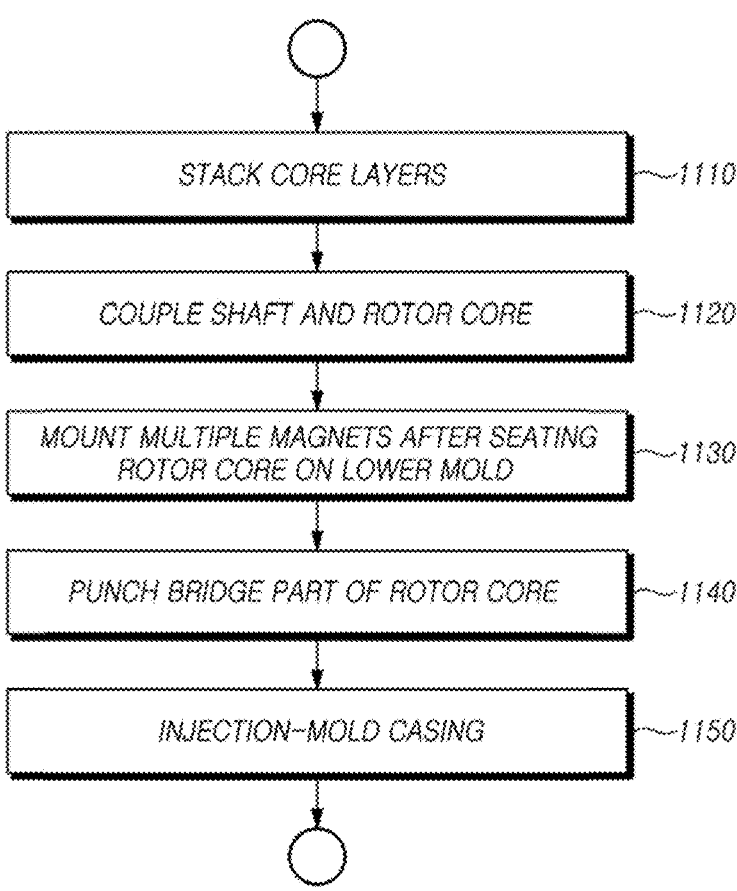
FIG. 11 is a flowchart illustrating a process of manufacturing a rotor according to an embodiment.

FIG. 11 is a flowchart illustrating a process of manufacturing a rotor according to an embodiment.

Figure 12A:
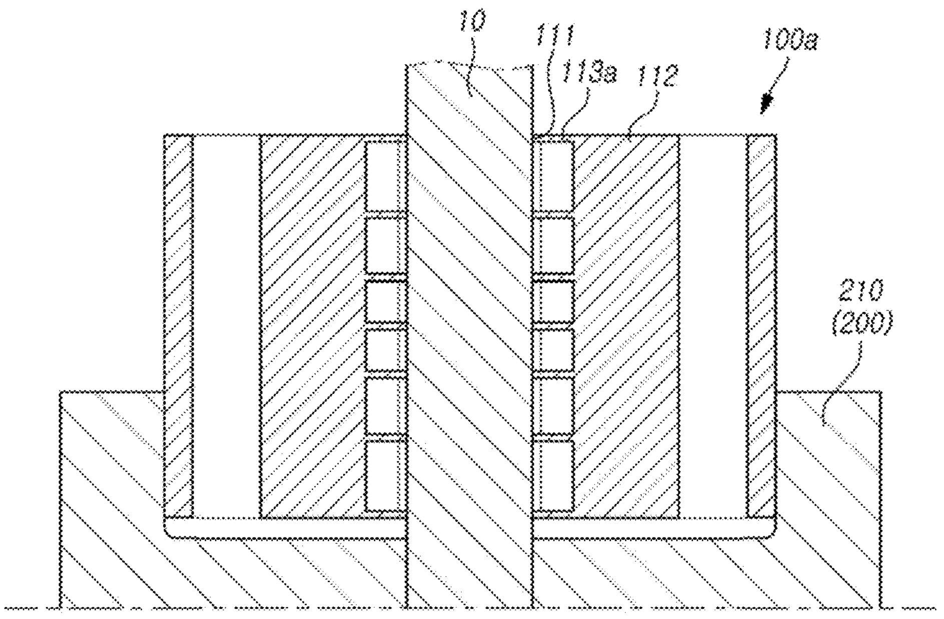
FIGS. 12A, 12B and 12C are views illustrating a process of manufacturing a rotor according to an embodiment.
Figure 12B:
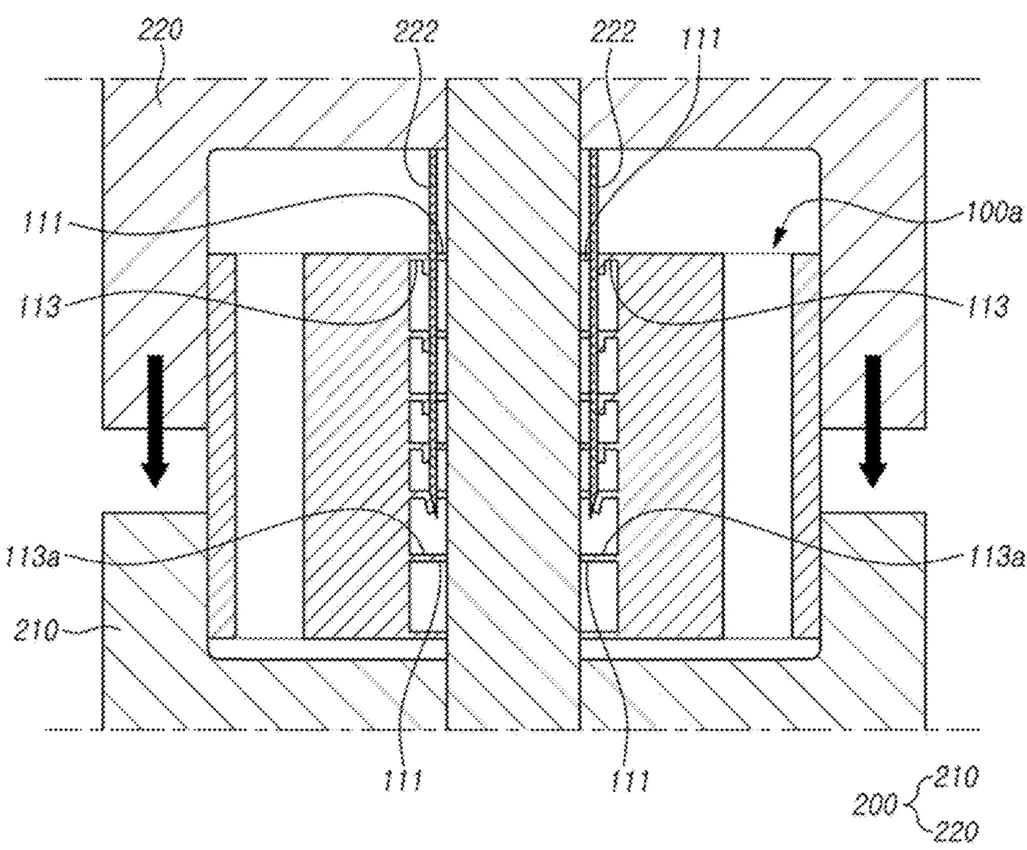
Figure 12C:
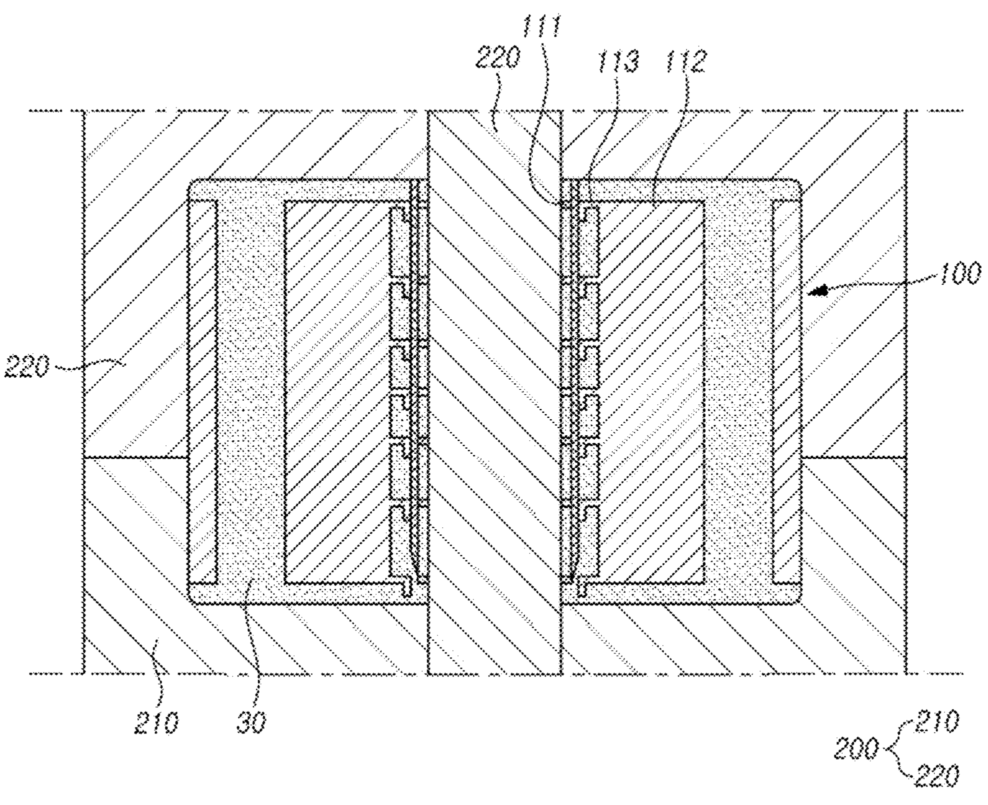

FIG. 12A, 12B AND 12C are views illustrating a process of manufacturing a rotor according to an embodiment.

FIG. 12A is a view illustrating a state in which the rotor core 100*a* to which the shaft 10 is coupled is seated on the lower mold 210. FIG. 12B is a view illustrating a state in which the upper mold 220 descends toward the rotor core 100*a* seated on the lower mold 210 and punches the bridge part 113*a* of the rotor core 100*a*. FIG. 12C is a view illustrating a state in which manufacturing of the rotor 1 is completed as the resin is injected and cured in the molding device 200 by the insert injection molding method after the punching of the bridge part 113 of the rotor core 100 is completed.

Referring to FIGS. 11, 12A, 12B AND 12C, the method for manufacturing the rotor 1 according to an embodiment may include forming the rotor core 100*a* by alternately stacking the first core layer 110*a* and the second core layer 120 having different shapes (1110).

According to an embodiment, the method for manufacturing the rotor 1 may include coupling the rotor core 100*a* and the shaft 10 by inserting the shaft 10 into the through hole 101 of the rotor core 100*a* (1120). In some embodiments, the shaft 10 may be inserted into the through hole 101 and coupled to the rotor core 100 after the rotor core 100 is insert-molded in step 1140 to be described below. In this case, the structure of the molding device may be partially changed so that the through hole 101 of the rotor core 100 is not filled with resin during insert injection molding.

According to an embodiment, the method for manufacturing the rotor 1 may include mounting the plurality of magnets 20 inside the rotor core 100*a* (1130). After the rotor core 100*a* is seated on the lower mold 210, each of the plurality of magnets 20 may be inserted into and mounted on the slot 103 provided between the plurality of core parts 112 and 121.

According to an embodiment, the method for manufacturing the rotor 1 may include the step 1140 of punching the bridge part 113*a* of the rotor core 100*a*.

According to an embodiment, the upper mold 220 of the molding device 200 may include a pair of punching parts 222 protruding from the lower surface at a position facing the bridge part 113*a* of the rotor core 100*a*. In an embodiment, the pair of punching parts 222 may include a sharp end portion 222*a* inclined at a free end thereof.

Referring to FIGS. 12A and 12B, in an embodiment, when the upper mold 220 descends toward the rotor core 100*a*, the punching part 222 of the upper mold 220 comes into contact with the bridge part 113*a* of the rotor core 100*a*. Thereafter, when the upper mold 220 continues to descend, the bridge part 113*a* is disconnected from the base part 111 by the clamping force of the upper mold 220, and the free end of the disconnected bridge part 113*a* is partially bent toward the inner surface of the rotor core 100. As described above, as the bridge part 113*a* of the rotor core 100*a* is disconnected from the base part 111 by the lowering operation of the upper mold 220, each of the core parts 112 and 121 is completely divided.

According to an embodiment, the method for manufacturing the rotor 1 may include injection molding 1150 of the injection molding member 30 by injecting and curing resin into the rotor core 100. Referring to FIG. 12C, a gap g is formed between the disconnected bridge part 113 and base part 111 of the rotor core 100 by the above-described step 1140. When the resin is injected into the molding device 200, the resin fills and cures in the rotor core 100 through an inner gap of the rotor core 100 such as the gap g. A portion of the injected resin may surround the bridge part 113 and firmly fix the divided rotor cores 102 inside the rotor 1.

Figure 13:
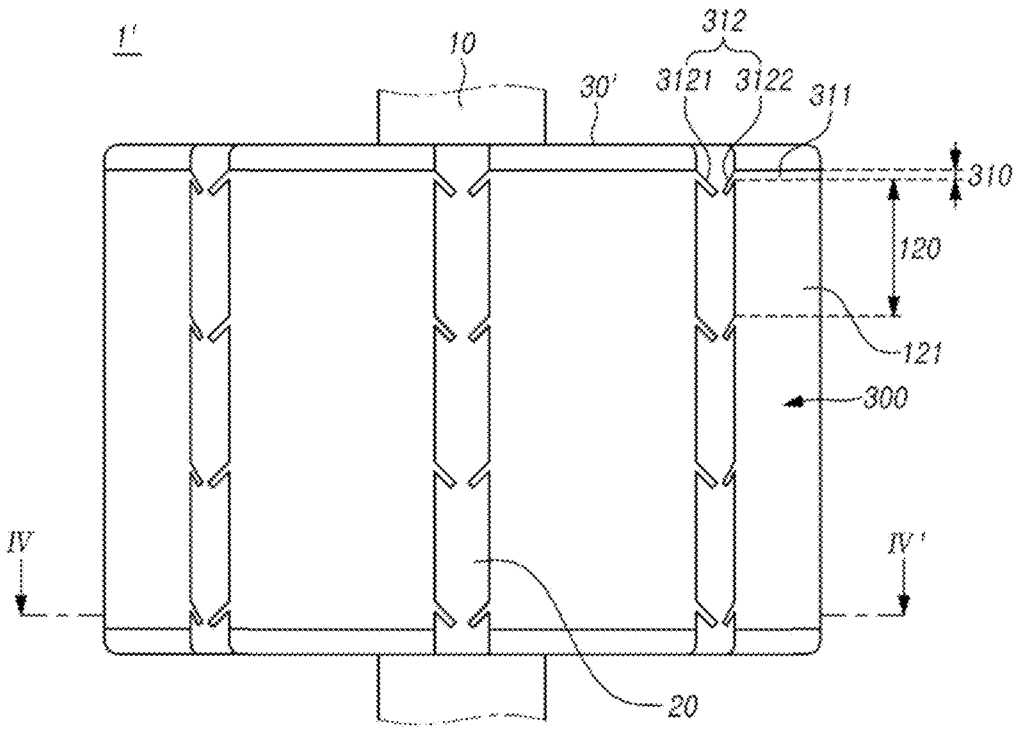
FIG. 13 is a side view illustrating a rotor according to an embodiment.

FIG. 13 is a side view illustrating a rotor according to an embodiment.

Figure 14:
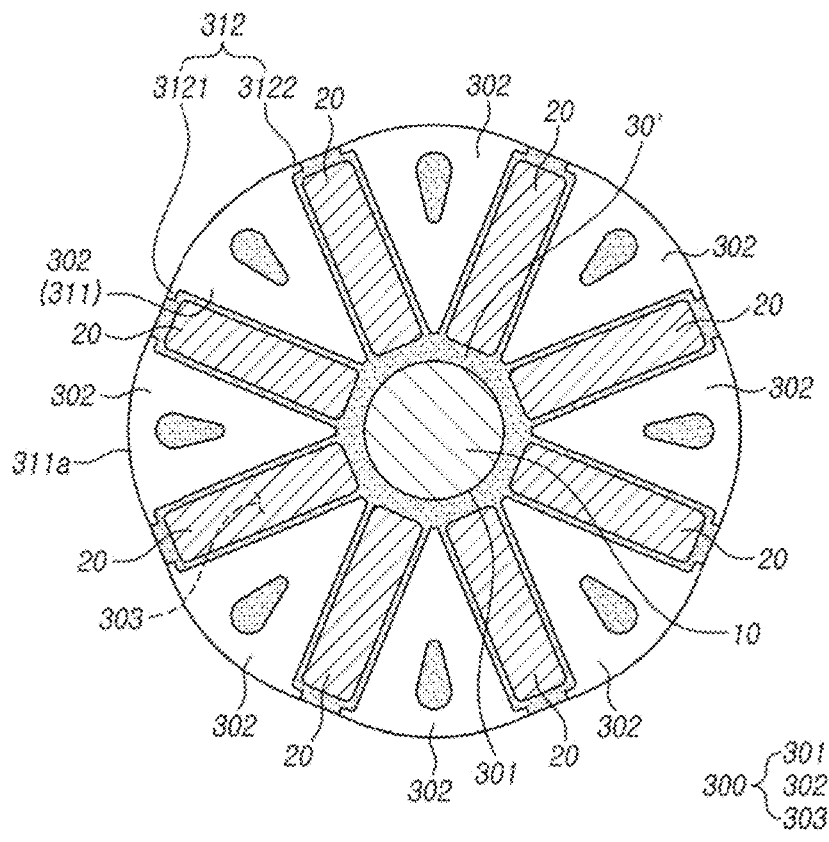
FIG. 14 is a cross-sectional view taken along line IV-IV' of FIG. 13.

FIG. 14 is a cross-sectional view taken along line IV-IV' of FIG. 13.

Referring to FIGS. 13 and 14, a rotor 1' according to an embodiment may include a shaft 10, a plurality of magnets 20, an injection molding member 30', and a rotor core 300.

According to an embodiment, the shaft 10 may be coupled to the rotor core 300. In an embodiment, the shaft 10 may be coupled to the inside of the rotor core 300 through a through hole 301 of the rotor core 300.

According to an embodiment, the plurality of magnets 20 may be inserted into and mounted on the rotor core 300. In an embodiment, the plurality of magnets 20 may be positioned radially outside the through hole 301 of the rotor core 300. In an embodiment, the plurality of magnets 20 may be disposed to be spaced apart from each other by a predetermined gap along the circumferential direction of the through hole 301. Each of the plurality of magnets 20 may be inserted into a slot 303 formed between the split rotor cores 302 of the rotor core 300, and fixed inside the rotor core 300.

According to an embodiment, the rotor core 300 may include a through hole 301, a plurality of split rotor cores 302, and a plurality of slots 303.

In an embodiment, the through hole 301 may be formed in a central portion of the rotor core 300. In an embodiment, the through hole 301 may extend in the vertical direction. The shaft 10 may be inserted into the rotor core 300 through the through hole 301, and the shaft 10 and the rotor core 300 may be coupled to each other as resin is injected and cured into the through hole 301 in a state in which the shaft 10 passes through the through hole 301.

In an embodiment, the plurality of split rotor cores 302 may be positioned radially outside the through hole 301 of the rotor core 300. In an embodiment, the plurality of split rotor cores 302 may be disposed to be spaced apart from each other by a predetermined gap along the circumferential direction of the through hole 301. A slot 303, which is a space into which a plurality of magnets 20 are inserted, may be formed between the plurality of split rotor cores 302. In an embodiment, the plurality of split rotor cores 302 may be split by the punching operation of the molding device 200 when the core parts 311 of the stacked core layers 310 and 120 are subjected to insert injection molding.

According to an embodiment, the rotor core 300 may be manufactured by stacking a plurality of thin steel sheets. In an embodiment, the rotor core 300 may include a plurality of first core layers 310 and a plurality of second core layers 120 where a plurality of thin steel sheets are stacked. In an embodiment, the steel sheets constituting the plurality of first core layers 310 and the steel sheets constituting the plurality of second core layers 120 may have different shapes. In an embodiment, the rotor core 300 may be formed by alternately stacking a plurality of first core layers 310 and a plurality of second core layers 120. The first core layer 310 may be disposed at, e.g., an uppermost end and a lowermost end of the rotor core 300, but the disclosure is not limited thereto.

According to an embodiment, the first core layer 310 may include a plurality of first core parts 311 and a plurality of bridge parts 312.

According to an embodiment, the plurality of first core parts 311 may be disposed to be spaced apart from each other by a predetermined gap along the circumferential direction of the through hole 301 with respect to the through hole 301. In an embodiment, a resin constituting the injection molding member 30' may fill and cure between the plurality of first core parts 311 and the shaft 10 inserted into the through hole 301.

According to an embodiment, each of the plurality of bridge parts 312 may include a pair of stop protrusions 3121 and 3122 protruding from the outer end 311*a* of the first core part 311 to two opposite sides in the circumferential direction.

In an embodiment, the pair of stop protrusions 3121 and 3122 may be bent to face two opposite side surfaces of the first core part 311. In an embodiment, the pair of stop protrusions 3121 and 3122 may extend obliquely from the outer end 311*a* of the first core part 311 toward the other first core part 311 adjacent to the first core part 311. In an embodiment, the stop protrusions 3121 and 3122 of the adjacent bridge parts 312 may be spaced apart from each other at a predetermined gap.

According to an embodiment, unlike the first core layer 310, the second core layer 120 may not include the bridge part 312.

According to an embodiment, the injection molding member 30' may be formed by injecting and curing resin into an empty space (or cavity) between internal gaps of the rotor core 300 while the plurality of magnets 20 are mounted on the rotor core 300.

In an embodiment, a portion of the resin injected into the rotor core 300 may be injected, through a gap between adjacent bridge parts 312, into the rotor core 300, and a portion of the resin may entirely surround the stop protrusions 3121 and 3122 of the bridge part 312. As the plurality of split rotor cores 302 are coupled with the injection molding member 30' by the stop protrusions 3121 and 3122 of the bridge part 312, the plurality of split rotor cores 102 may be prevented from scattering to the outside by the rotational force of the motor when the motor is operated.

Figure 15:
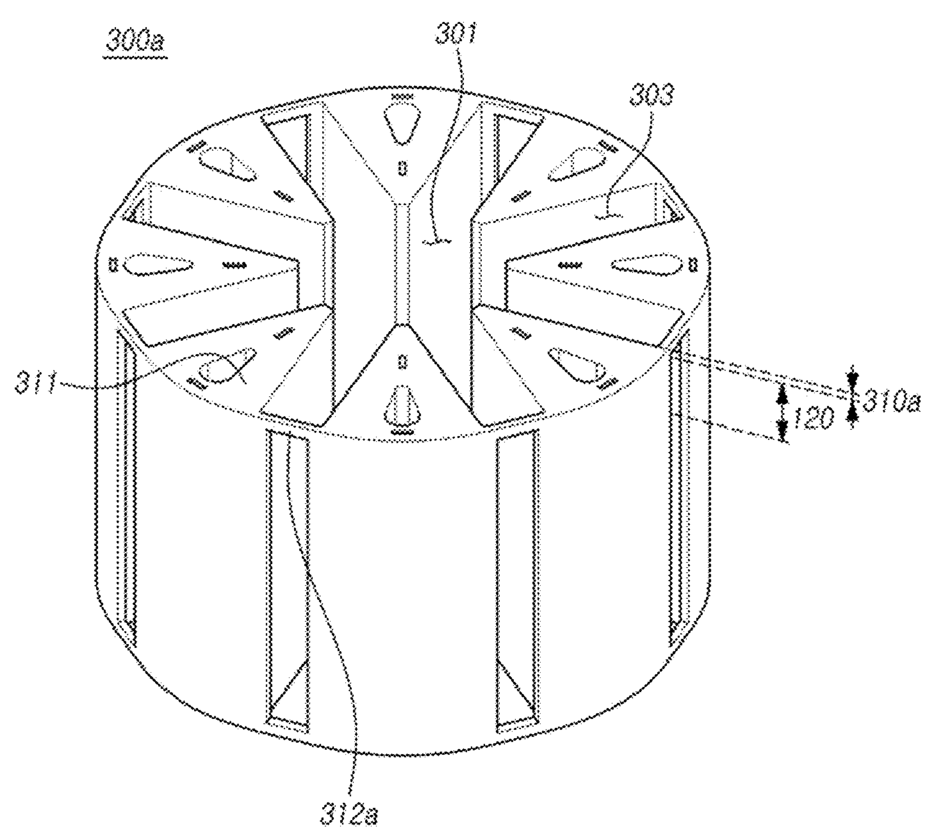
FIG. 15 is a perspective view illustrating a rotor core before punching according to an embodiment.

FIG. 15 is a perspective view illustrating a rotor core before punching according to an embodiment.

Figure 16:
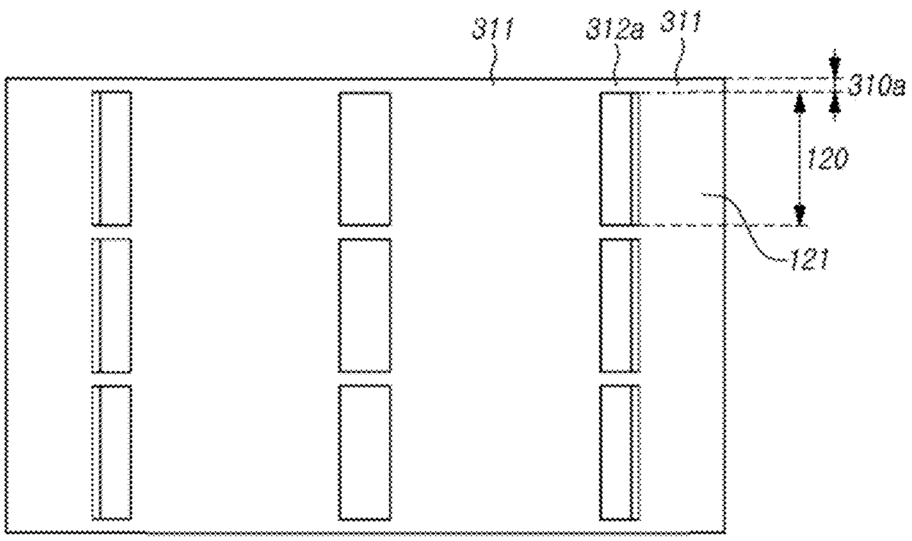
FIG. 16 is a side view illustrating a rotor core before punching according to an embodiment.

FIG. 16 is a side view illustrating a rotor core before punching according to an embodiment.

Figure 17:
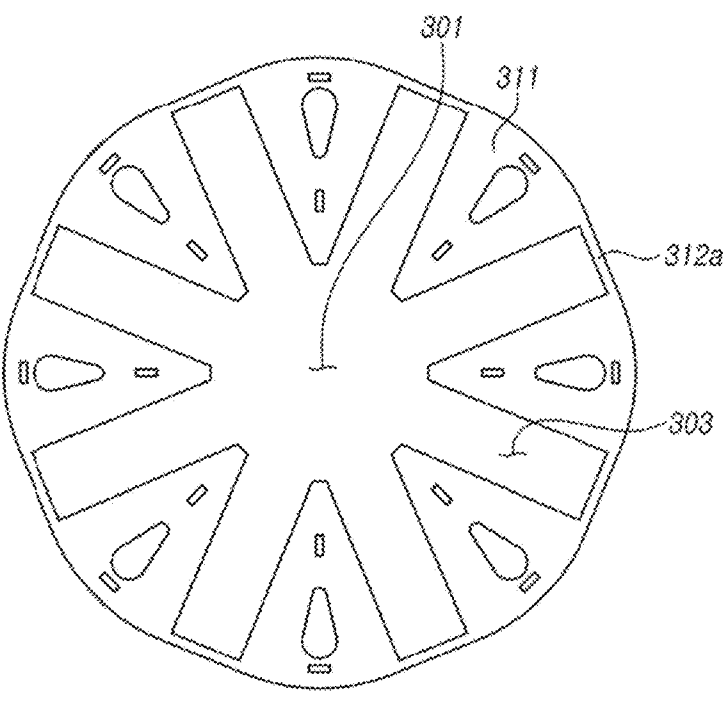
FIG. 17 is a plan view illustrating a rotor core before punching according to an embodiment.

FIG. 17 is a plan view illustrating a rotor core before punching according to an embodiment.

Figure 18:
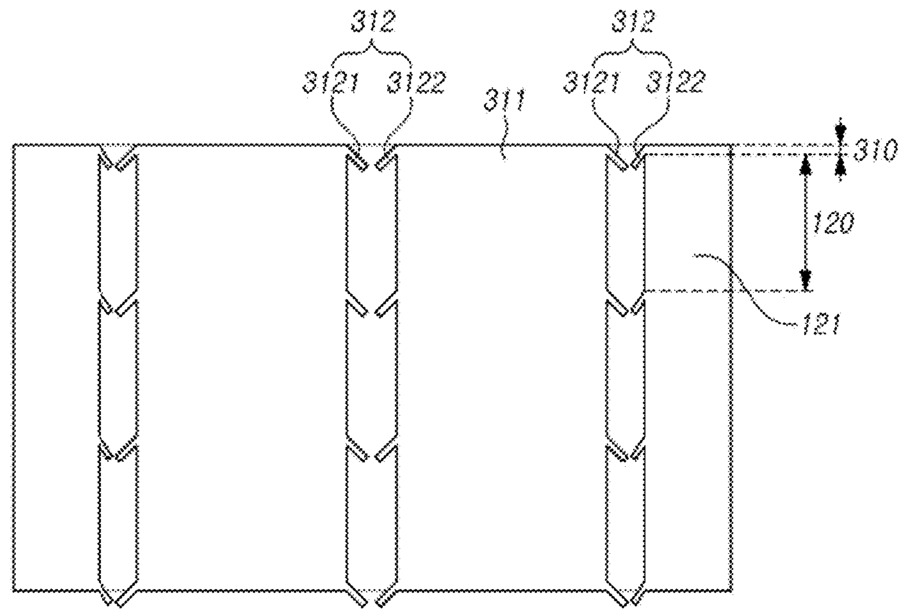
FIG. 18 is a side view illustrating a rotor core after punching according to an embodiment.

FIG. 18 is a side view illustrating a rotor core after punching according to an embodiment.

Figure 19:
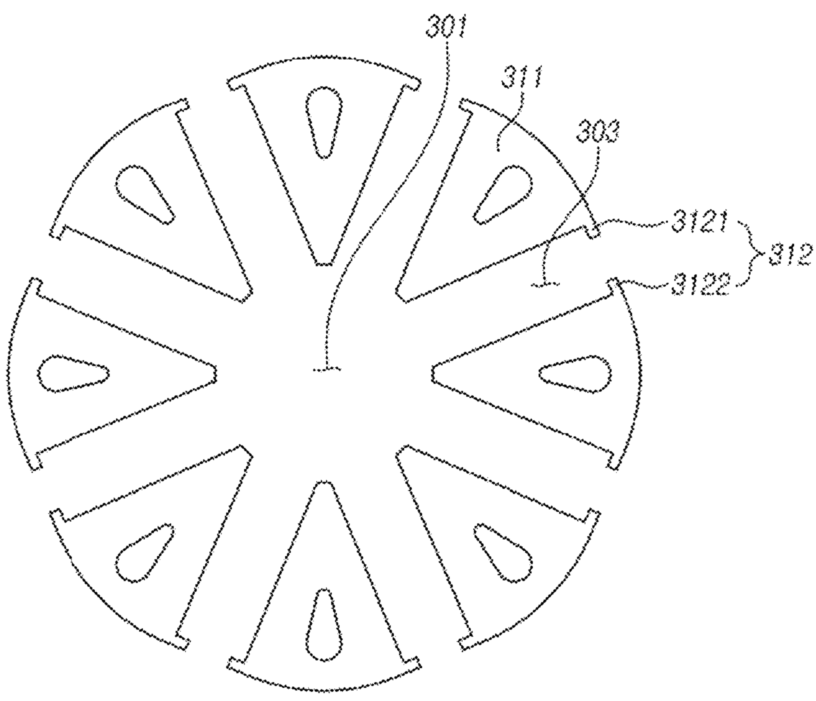
FIG. 19 is a plan view illustrating a rotor core after punching according to an embodiment.

FIG. 19 is a plan view illustrating a rotor core after punching according to an embodiment.

FIGS. 15 to 17 are views illustrating a rotor core 300*a* including a first core layer 310*a* in which adjacent first core parts 311 are connected to each other through a bridge part 312*a*. FIGS. 15 to 17 illustrate a rotor core 300*a* including a bridge part 312*a* before being punched by the molding device (e.g., the molding device 200 of FIGS. 12A, 12B, and 12C).

FIGS. 18 and 19 are views illustrating a rotor core 300 including a first core layer 310 in which a plurality of first core parts 311 are spaced apart from each other. FIGS. 18 and 19 illustrate a rotor core 300 including a bridge part 312 after being punched by the molding device 200.

Referring to FIGS. 15 to 17, the first core layer 310*a* of the rotor core 300*a* according to an embodiment may include a bridge part 312*a* connecting adjacent first core parts 311 to each other. When the plurality of first core parts 311 are connected to each other by the bridge part 312*a*, the efficiency of the motor may be reduced by a leakage flux flowing along the bridge part 312*a* when the motor is operated.

In order to reduce the leakage magnetic flux through the bridge part 312*a*, it is necessary to disconnect and divide the adjacent first core parts 311 from each other as illustrated in FIGS. 13 and 14.

Referring to FIGS. 18 and 19, the first core layer 310 of the rotor core 300 according to an embodiment may include a plurality of first core parts 311 spaced apart from each other. For example, the plurality of first core parts 311 may divide the first core parts 311*a* from each other by punching the bridge part 312*a* connecting the plurality of first core parts 311*a* of FIGS. 15 to 17 through the molding device 200. In this case, magnetic flux leakage through the bridge part 312*a* may be reduced.

A motor according to an embodiment of the disclosure may include a shaft 10, a stator and a rotor 1. The rotor 1 may include a plurality of magnets 20, a casing 30, and a rotor core 100. The rotor core 100 may include a plurality of first core layers 110 and a plurality of second core layers 120. The first core layer 120 may include a base part 111 through which the shaft 10 passes. The first core layer 120 may include a plurality of core parts 112 and 121 spaced apart from each other along a circumferential direction of the base part 111. The first core layer 120 may include a plurality of bridge parts 113 and 113' configured so that each of the plurality of bridge parts 113 and 113' extends from a corresponding core part of the plurality of core parts 112 toward the base part 111 and is bent toward the corresponding core part 112.

According to an embodiment, each bridge part 113 of the plurality of bridge parts 113 may be bent vertically from the corresponding core part 112.

According to an embodiment, each bridge part 113' of the plurality of bridge parts 113' may be bent to be inclined from the corresponding core part 112.

According to an embodiment, the plurality of core parts of the first core layer 110 may are the plurality of first core parts 112 and the second core layer 200 may include a plurality of second core parts 121 not connected to the plurality of bridge parts 113 and 113'.

According to an embodiment, the plurality of first core layers 110 and the plurality of second core layers 120 may be alternately stacked in a vertical direction.

According to an embodiment, each of the plurality of bridge parts 113 may be spaced apart from the base part 111 by a predetermined gap g.

According to an embodiment, each of the plurality of core parts 112 may include a pair of bending grooves 1122 respectively disposed on both sides of the bridge part 113 extending from the respective core part 112.

According to an embodiment, the casing 30 may include resin surrounds the rotor core 100 and at least a portion of each of the plurality of magnets 20.

A motor according to an embodiment of the disclosure may include a shaft, a stator and a rotor 1. The rotor 1 may include a plurality of magnets 20, a casing 30', and a rotor core 300. The rotor core 300 may include a through hole 301 into which the shaft 10 is inserted, a plurality of first core layers 310 and a plurality of second layers 320. The first core layer 310 may include a plurality of core parts 311 spaced apart from each other along a circumferential direction of the through hole 301. The first core layer 310 may include a plurality of bridge parts 312 including a pair of stop protrusions 3121 and 3122 respectively protruding in the circumferential direction from each side of, and bent toward, an outer end 311*a* of each core part 311 of the plurality of core parts 311.

According to an embodiment, the pair of stop protrusions 3121 and 3122 may be bent to be inclined from the core part 311.

According to an embodiment, the plurality of first core parts 311 of the first core layer 310 may be the plurality of first core parts 311 and the plurality of second core layers 121 may include a plurality of second core parts 121 not connected to the plurality of bridge parts 312.

According to an embodiment, the plurality of first core layers 310 and the plurality of second core layers 120 may be alternately stacked in the vertical direction.

According to an embodiment, the stop protrusions 3121 and 3122 protruding from each side of an outer end 311*a* of one core part 311 of the plurality of core parts 311 may be spaced apart from the stop protrusions 3121 and 3122 protruding from a side of an outer end 311*a* of other core parts 311 of the plurality of core parts 311 adjacent to the one core part 311.

According to an embodiment, the casing 30 may include resin surrounds the rotor core 300 and at least a portion of each of the plurality of magnets 20.

A method for manufacturing a motor including a shaft, a stator and a rotor 1 including a plurality of magnets 20, a casing 30 or 30', and a rotor core 100 or 300, according to an embodiment of the disclosure may include forming the rotor core 100*a* or 300*a* by stacking a first core layer 110*a* or 310*a* including a plurality of bridge parts 113*a* or 312*a* and a second core layer 120 not including the plurality of bridge parts 113*a* or 312*a* (1110). The method for manufacturing the motor may include seating the rotor core 100*a* or 300*a* on a lower mold 210. The method for manufacturing the motor may include mounting a plurality of magnets 20 on the rotor core 100*a* or 300*a* (1130). The method for manufacturing the motor may include punching the plurality of bridge parts 113*a* or 312*a* of the first core layer 110*a* or 310*a* by lowering an upper mold 220 having a punching part 222 (1140).

According to an embodiment, the method for manufacturing the motor may include coupling the rotor core 100*a* or 300 to a shaft 10 by inserting the shaft 10 into a through hole 101 or 301 of the rotor core 100*a* or 300*a* (1120).

According to an embodiment, the method for manufacturing the motor may include by injecting and curing resin into the molding device 210 and 220 to form the casing so as to surround at least a portion of the rotor core 100 or 300 (1150).

According to an embodiment, the method for manufacturing the motor may include arranging the stator to surround the rotor 1 to electromagnetically interact with the rotor 1.

According to an embodiment, the plurality of bridge parts 113*a* or 312*a* may be bent toward the first core layer 110*a* or 310*a* by lowering of the upper mold 220.

According to an embodiment, the first core layer 110*a* may include a base part 111 and a plurality of core parts 112 respectively connected to base part 111 through respective bridge parts 113*a* the plurality of bridge parts 113*a*, and the base part 111 and the plurality of core parts 112 may be disconnected from each other by lowering of the upper mold 220.

According to an embodiment, the first core layer 310*a* may include a plurality of core parts 311 connected to each other through the plurality of bridge parts 312*a*, and the plurality of core parts 311 may be disconnected from each other by lowering of the upper mold 220.

What is claimed is:

1. A motor comprising:

a shaft;

a stator; and a rotor, wherein the rotor includes:

a plurality of magnets;

a casing; and a rotor core, wherein the rotor core includes a plurality of first core layers and a plurality of second core layers, wherein the first core layer includes:

a base part through which the shaft passes, a plurality of core parts spaced apart from each other along a circumferential direction of the base part, and a plurality of bridge parts configured so that each of the plurality of bridge parts extends from a corresponding core part of the plurality of core parts toward the base part, and is bent toward the corresponding core part.

2. The motor of claim 1, wherein each bridge part of the plurality of bridge parts is bent vertically from the corresponding core part.

3. The motor of claim 1, wherein each bridge part of the plurality of bridge parts is bent to be inclined from the corresponding core part.

4. The motor of claim 1, wherein the plurality of core parts of the first core layer are the plurality of first core parts, and the second core layer includes a plurality of second core parts not connected to the plurality of bridge parts.

5. The motor of claim 1, wherein the plurality of first core layers and the plurality of second core layers are alternately stacked in a vertical direction.

6. The motor of claim 1, wherein each of the plurality of bridge parts is spaced apart from the base part by a predetermined gap.

7. The motor of claim 1, wherein each of the plurality of core parts includes a pair of bending grooves respectively disposed on both sides of the bridge part extending from the respective core part.

8. The motor of claim 1, wherein the casing includes resin that surrounds the rotor core and at least a portion of each of the plurality of magnets.

9. A motor comprising:

a shaft;

a stator; and a rotor, wherein the rotor includes:

a plurality of magnets;

a casing; and a rotor core, wherein the rotor core includes:

a through hole into which the shaft is inserted, a plurality of first core layers, and a plurality of second core layers, wherein first core layer includes:

a plurality of core parts spaced apart from each other along a circumferential direction of the through hole, and a plurality of bridge parts including a pair of stop protrusions respectively protruding in a circumferential direction from each side of, and bent toward, an outer end of each core part of the plurality of core parts.

10. The motor of claim 9, wherein the pair of stop protrusions are bent to be inclined from the core part.

11. The motor of claim 9, wherein the plurality of core parts of the first core layer are the plurality of first core parts, and the second core layer includes a plurality of second core parts not connected to the plurality of bridge parts.

12. The motor of claim 9, wherein the plurality of first core layers and the plurality of second core layers are alternately stacked in a vertical direction.

13. The motor of claim 9, wherein the stop protrusions protruding from each side of an outer end of one core part of the plurality of core parts are spaced apart from the stop protrusions protruding from a side of an outer end of other core parts of the plurality of core parts adjacent to the one core part.

14. The motor of claim 9, wherein the casing includes resin that surrounds the rotor core and at least a portion of each of the plurality of magnets.

15. A method of manufacturing a motor including a shaft, a stator and a rotor including a plurality of magnets, a casing and a rotor core, the method comprising:

forming the rotor core by stacking a first core layer, including a plurality of bridge parts, and a second core layer not including the plurality of bridge parts;

seating the rotor core on a lower mold;

mounting the plurality of magnets on the rotor core; and lowering an upper mold having a punching part to punch the plurality of bridge parts of the first core layer.

16. The method of claim 15, further comprising:

coupling the rotor core to the shaft by inserting the shaft into a through hole of the rotor core.

17. The method of claim 15, further comprising:

injecting and curing resin into a molding device to form the casing so as to surround at least a portion of the rotor core.

18. The method of claim 15, further comprising:

arranging the stator to surround the rotor to electromagnetically interact with the rotor.

19. The method of claim 15, wherein the first core layer includes a base part and a plurality of core parts respectively connected to the base part through respective bridge parts of the plurality of bridge parts, the plurality of bridge parts are bent toward the first core layer by lowering the upper mold, and the base part and the plurality of core parts are disconnected from each other by lowering the upper mold.

20. The method of claim 15, wherein the first core layer includes a plurality of core parts connected to each other through the plurality of bridge parts, the plurality of bridge parts are bent toward the first core layer by lowering the upper mold, and the plurality of core parts are disconnected from each other by lowering the upper mold.

* * * * *